March 27, 1934.  K. MURAKAMI  1,952,936
ELECTRIC GENERATOR SYSTEM
Filed Aug. 9, 1933
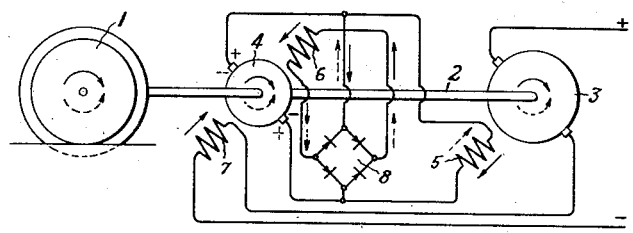
Inventor:
Katsuzo Murakami,
by Harry E. Dunham
His Attorney.

Patented Mar. 27, 1934

1,952,936

UNITED STATES PATENT OFFICE 1,952,936

ELECTRIC GENERATOR SYSTEM

Katsuzo Murakami, Tokyo, Japan, assignor to General Electric Company, a corporation of New York Application August 9, 1933, Serial No. 684,428
In Japan September 1, 1932

3 Claims. (Cl. 171—312)

My invention relates to electric generator systems and more particularly to a constant polarity reversibly driven direct current generator system.

It is sometimes necessary to provide constant polarity direct current from a generator which can only be conveniently driven from a source of reversible rotation. For example, in the electrical systems for trains it is necessary to provide constant polarity for battery charging, but the direct current generator, which is usually axle driven must ordinarily be operated in both directions because railway cars must be capable of being operated either end first.

In accordance with my invention I provide an extremely simple, rugged and inexpensive system for insuring constant polarity of a direct current generator, regardless of its direction of rotation. This system comprises exciting the generator from an exciter which is driven with the generator and energizing the field winding of the exciter through a rectifier. With such an arrangement the polarity of the exciter will reverse with reversal of its rotation, but due to the presence of the rectifier the exciter can build up a self-excited voltage because the rectifier causes energization of the field winding with current in the same direction at all times regardless of the polarity of the exciter, and consequently the residual magnetism of the exciter is never bucked down. The reversal of polarity of the exciter causes reversal of the excitation of the main generator with reversal of its rotation, so that polarity of the generator is the same regardless of the direction of rotation.

An object of my invention is to provide a new and improved electric generator system.

A further object of my invention is to provide a new and improved system for insuring constant polarity of a direct current generator regardless of its direction of rotation.

My invention will be better understood from the following description taken in connection with the accompanying drawing and its scope will be pointed out in the appended claims.

In the single figure of the accompanying drawing there is shown a suitable source of reversible rotation, such for example, as a railway car wheel 1 which has an axle 2 from which a direct current generator 3 is driven in any suitable manner, such as directly, as shown. Also driven by the axle 2 is an exciter 4 for the generator 3, which generator has a field winding 5 connected across the terminals of the exciter 4. The exciter 4 is provided with two field windings 6 and 7. Field winding 6 is energized from the exciter through a suitable rectifier 8, such for example, as a full wave copper oxide rectifier. Field winding 7 is connected in circuit with generator 3 and is arranged differentially with respect to field winding 6.

The operation of the illustrated embodiment of my invention is as follows: Assume that wheel 1 and the machines 3 and 4 are rotating in a clockwise direction, as indicated by the continuous arrows indicating rotation. Assume further that the currents in the various windings and conductors, and the polarities of the machines, are as indicated by the continuous direction indicating arrows and polarity markers, respectively. If now the direction of rotation reverses and becomes counterclockwise, as indicated by the dashed arrows indicating rotation, the polarity of the exciter 4 will reverse, as indicated by the dashed polarity markers associated with the brushes of the exciter. However, the rectifier 8 prevents a reversal of current in the field winding 6 and consequently the voltage of the exciter will build up as the speed increases, but the voltage will be of reverse polarity. This reverse polarity voltage is applied to the field winding 5 of generator 3 whereby the current in this field winding is reversed, as is indicated by the dashed arrow associated with this field winding, and this in turn reverses the flux of generator 3 and thereby causes its polarity to remain the same because both its field flux and direction of rotation have been reversed. It is thus seen that regardless of the direction of rotation of generator 3 its polarity will always be the same.

The purpose of field winding 7 is to provide a regulating action. Thus, as the speed of the system increases the voltage of the generators tends to increase and this in turn tends to increase the current output of the generator 3, but this current flowing through the differential winding 7 tends to reduce the voltage of exciter 4 and this in turn tends to reduce the excitation of generator 3 whereby its increase in voltage is reduced.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a reversibly driven direct current generator, means for maintaining constant polarity of said generator comprising an exciter driven with said generator, a field winding for said exciter, and a rectifier connecting said field winding to said exciter.

2. In combination, a source of reversible rotation, a direct current generator driven thereby, and means for insuring constant polarity of said generator regardless of its direction of rotation comprising an exciter for said generator driven by said source, a shunt field winding for said exciter and a full wave rectifier electrically interposed between said field winding and said exciter.

3. In combination, a source of reversible rotation, a direct current generator driven thereby, a field winding for said generator, an exciter driven by said source and connected to energize said field winding, a field winding for said exciter, a full wave rectifier connected between said exciter and said exciter field winding, and a second field winding for said exciter connected in series with said generator so as to oppose the action of the first mentioned exciter field winding.

KATSUZO MURAKAMI.